Figure 1:
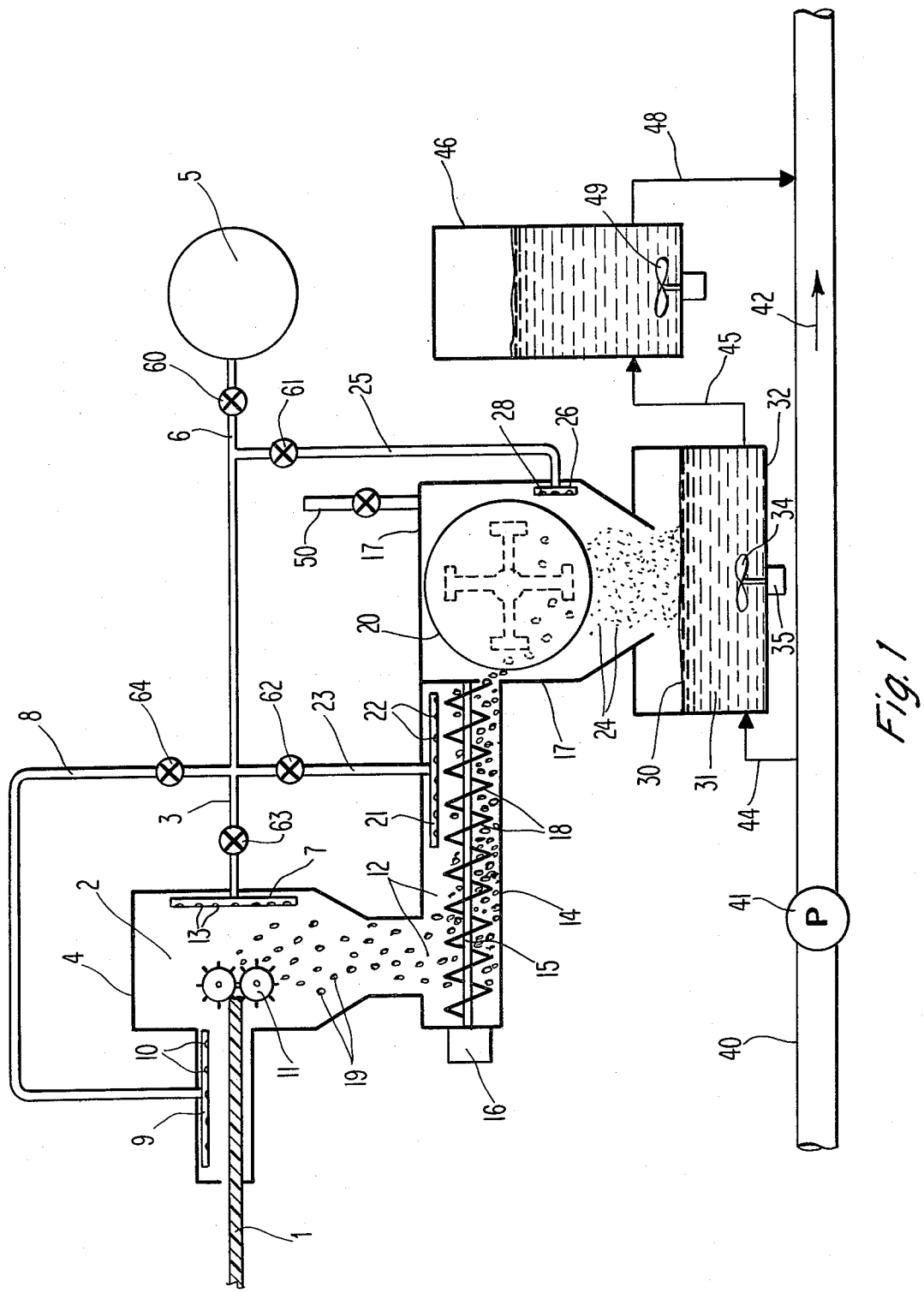

United States Patent [19]

Weitzen

[11] 4,340,076
[45] Jul. 20, 1982

[54] DISSOLVING POLYMERS IN COMPATIBLE LIQUIDS AND USES THEREOF

[75] Inventor: William Weitzen, Bethesda, Md.

[73] Assignee: General Technology Applications, Inc., Arlington, Va.

[21] Appl. No.: 117,235

[22] Filed: Jan. 31, 1980

Related U.S. Application Data

[63] Continuation-in-part of Ser. No. 15,680, Feb. 27, 1979, abandoned.

[51] Int. Cl.$^3$ ................................ F17D 1/16
[52] U.S. Cl. ...................... 137/13; 241/23; 241/65; 422/901
[58] Field of Search ............... 137/1, 13; 241/65, 23; 422/901; 23/293 R

[56] References Cited

U.S. PATENT DOCUMENTS 3,215,154  11/1965  White .................... 137/13
3,771,729  11/1973  Freble ................... 241/65

OTHER PUBLICATIONS

A. M. Dubinskaya and P. Yu. Butyagin, "Mechanical--Chemical Investigations of Some Free Radical Reactions in the Solid Phase" *Kinetics & Catalysis*, vol. 9, pp. 839-846, Jul., 1968.

*Primary Examiner*—Alan Cohan
*Attorney, Agent, or Firm*—Roland H. Shubert

[57] ABSTRACT

This invention provides a technique for extremely rapid dissolution, or dispersion on essentially the molecular level, of certain polymeric materials in compatible liquid vehicles. The polymeric materials are comminuted at cryogenic temperatures and are then introduced into a liquid vehicle preferably while still at or near cryogenic temperature. At low concentrations, the resulting blend or system displays reduced friction to flow while high concentrations may be used to immobilize the liquid vehicle and/or reduce its vapor pressure.

21 Claims, 2 Drawing Figures

DISSOLVING POLYMERS IN COMPATIBLE LIQUIDS AND USES THEREOF

CROSS-REFERENCES TO RELATED APPLICATIONS

This application is a continuation-in-part of U.S. patent application, Ser. No. 015,680, filed Feb. 27, 1979 now abandoned.

BACKGROUND OF THE INVENTION

It is well known that many polymeric materials may be dissolved in, or dispersed on essentially the molecular level so as to form a gel, with appropriate liquid vehicles provided that there is a high mutual compatibility between the polymeric material and the liquid vehicle. Dissolution or gel formation is typically accomplished by contacting the polymer and vehicle at ambient to relatively elevated temperatures. It is generally accepted in the art that an increase in temperature will speed dissolution of the polymer as will an increase in surface area as by comminution of the polymer into relatively small particles. Often, dissolution is accomplished by refluxing boiling vehicle or solvent over polymer particles.

Polyisobutylene, for example, is recognized to be soluble in hydrocarbon solvents such as kerosene and the like as is shown in U.S. Pat. No. 3,215,154 but its rate of dissolution is slow. Patentees teach heating the polymer-solvent mixture so as to increase the speed of dissolution and also recommend shredding or grinding the polymer to a particle size of 40 mesh or finer. Even with use of these techniques, a number of hours are required to fully dissolve the polymer in the solvent.

Because many polymeric materials are relatively soft and resilient, they are extremely difficult and often impossible to comminute by conventional grinding techniques. Even after comminution, the so-formed particles tend to stick and clump together thus negating the practical effect of such comminution.

It is also known to comminute relatively non-brittle materials, including rubbery polymers such as polyisobutylene, by cooling the materials below their embrittlement temperature using refrigerants. A cryogenic comminution system for such purposes is described in U.S. Pat. No. 3,771,729.

Polymeric materials dissolved or dispersed in liquid vehicles find use in a number of different applications. One such general application includes film forming as by casting, spraying, brushing or otherwise applying the polymer solution to a surface. The liquid vehicle is then removed, usually by evaporation, to leave a polymer film upon the surface. Cast films may be dense, in which case they are used as intrusion barriers or they may be somewhat porous and be used as breathing films or separation membranes. Sprayed or brushed films are most often applied as barrier films. Polymer solutions may also be used to form fibers by spinning, extrusion, or similar techniques. In film or fiber forming applications, it is generally advantageous to utilize a relatively concentrated solution of polymer in the liquid vehicle. Many commercial adhesives are also concentrated polymeric solutions.

There are a number of specialized uses for relatively dilute solutions of particular polymers in solvents. One such specialized use that has been the subject of extensive research is the reduction of friction in liquids flowing through conduits or around objects.

Hydrodynamics theory and practice demonstrate that the drag or friction caused by flowing liquid in a conduit increases the energy requirements to transport that liquid. This fact is particularly noticeable in the transportation or movement of hydrocarbons in pipelines as energy requirements increase as the square of the flow. It is recognized that increasing pumping power for flow augmentation can exceed conduit pressure limitations with accompanying deleterious effects. The pressure drop in a pipeline as liquids are pumped therethrough is a manifestation of this drag or friction.

Various means have been tried to reduce the undesirable effects of friction mentioned above. The addition of friction-reducing agents is described, for example, in U.S. Pat. Nos. 3,215,154; 3,682,187; 3,687,148; and 3,910,856. However, little success has been obtained by such additives because of the high cost or unavailability of the additive; the cost of effectively adding the additive to the hydrocarbons and dissolution therein, which may require many hours; the incompatibility of the additive with the subsequent use of the hydrocarbons; or the like. Thus, U.S. Pat. No. 3,215,154 describes, to reduce friction, intermixing with liquid hydrocarbons certain polyisobutylene resins as shredded, pulverized or ground solids, preferably of a particle size no greater than 40 U.S. standard screen scale. Natural rubber is also described as operable, but not as effective as polyisobutylene resin. The rate of solution of the polyisobutylene is described as slow; in what is described as an effective embodiment, polyisobutylene of 1020 U.S. standard screen scale particle size required stirring for two hours, with the necessity of an additional time required for complete solution. To decrease the time for dissolving the resin, as is described in the patent, the hydrocarbons can be heated up to about 200° F. Also, the preparation of shredded, pulverized or ground polyisobutylene by usual means for subsequent dissolution causes degradation of the polymer; i.e., causes a reduction of molecular weight in some of the polymer molecules through shearing action and the heat generated thereby. Since it is known that friction reduction is dependent on long chain polymer molecules of relatively high molecular weight, such prior methods of shredding, pulverizing or grinding causes a reduction of the effectiveness of the polyisobutylene or other long chain polymers. Furthermore, the particles so prepared, when in contact with each other prior to introduction into the liquid hydrocarbons tend immediately to conglomerate into large masses, especially as fresh surfaces contact other fresh surfaces. The tough, strongly adhered polyisobutylene mass dissolves in hydrocarbon liquids only with difficulty and slowly, as above described. In fact, the stirring action over the long time required to dissolve a polyisobutylene mass causes additional shearing and degradation of the polymer molecules to the detriment of its friction-reducing properties.

SUMMARY OF THE INVENTION

The present invention provides a process for very rapidly dissolving, or dispersing on essentially a molecular level, certain types of polymeric materials in compatible liquid vehicles. Dissolution is accomplished by comminuting the polymeric material at cryogenic temperatures and thereafter admixing the comminuted material, preferably still at cryogenic temperature, to the liquid vehicle. The temperature of the liquid vehicle at the time of admixing is not critical except that it must be at a temperature substantially above its pour point. Ambient to slightly elevated liquid temperatures are preferred.

One specific embodiment of the present invention provides a process for introducing a long chain polymeric friction-reducing additive, such as polyisobutylene, into liquid hydrocarbons wherein the additive is not degraded significantly prior to the introduction and wherein dissolution is accomplished rapidly. The invention provides for cryogenic comminuting of the additive and introducing the additive as discrete particles, preferably at cryogenic temperature, into hydrocarbon liquids for rapid dissolution.

FIG. 1 of the drawing is a simplified illustration of an embodiment of the invention showing the cryogenic comminuting of polyisobutylene, the addition of discrete particles of polyisobutylene at cryogenic temperature to liquid hydrocarbons for dissolution therein, and subsequent introduction of the hydrocarbons containing dissolved polyisobutylene into a pipeline transporting a main stream of liquid hydrocarbons.

Figure 2:
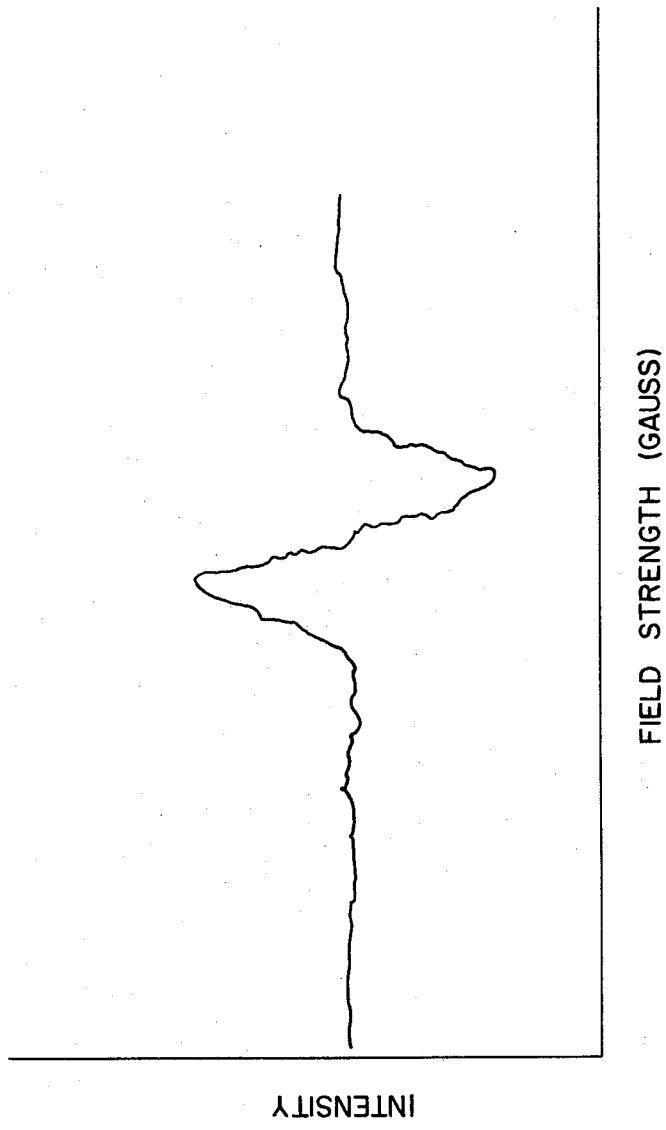

FIG. 2 depicts a typical electron spin resonance plot obtained by analysis of a cryogenically comminuted polymer maintained at odd temperatures.

DESCRIPTION OF THE INVENTION

It has been found that certain polymeric materials may be very rapidly dissolved in compatible liquid vehicles at relatively high concentration provided that certain critera are met. The polymeric materials must be cryogenically comminuted and maintained in a surface active state until admixed with the liquid vehicle. Dissolution of the polymer in the liquid vehicle upon admixing is extremely rapid; essentially instantaneous in many instances.

The term "polyermic materials" as used herein includes both natural and synthetic linear thermoplastic polymers. Such polymers may vary in molecular weight from a few thousand to 10,000,000 or more; may be crystalline or amorphous, atactic or isotactic, homopolymers or heteropolymers, provided that no significant degree of crosslinking is present. A minor amount of crosslinking can be tolerated in certain low molecular weight polymers. Exemplary polymer systems useful in the practice of this invention include the hydrocarbon polymers in general, especially the rubbery hydrocarbon polymers such as polyisobutylene; acrylic and other acetal film forming polymers such as the acrylic and vinyl resins as well as esters of cellulose, halogenated polymers such as the polyvinyl and polyvinlidene halides, polyethers, nitriles, polyamides, polyimides, polyesters, silicones, sulfones, certain polyurethanes, polysulfides, and also including polyvinyl acetate, polyvinyl butyrate, polyvinyl carbazole as well as copolymers and terpolymers containing portions of these, in part; fiber forming polymers including nylons and polyesters and membrane forming polymers such as aramid and ionomer polymers.

Appropriate polymeric materials are dissolved in compatible liquid vehicles by practice of this invention. The term "dissolved" as used herein includes dispersion of the polymeric material on essentially the molecular level within the liquid vehicle as in the formation of a gel. Whether truly dissolved or dispersed as a gel, the admixtures of polymer and vehicle are characterized as being essentially infinitely dilutable blends or systems.

Compatible liquid vehicles include all of those non-aqueous liquids in which the polymeric materials can be dispersed at the molecular level. In general, a liquid vehicle compatible with a particular polymer must be capable of dissolving that polymer, at least to some degree, by conventional dissolution techniques. In no case is water an appropriate or compatible liquid vehicle because the polymer systems useful in this invention are essentially insoluble in water and because water neutralizes or tends to destroy the surface active properties of the cryogenically comminuted polymer particles. The limits of solubility of polymer in vehicle, of course, vary as in conventional systems but in most cases the dissolution method of this invention allows preparation of much more concentrated polymer solutions than are readily attainable by conventional methods.

As may be readily appreciated, not all liquid vehicles are compatible with all polymers. Exemplary polymer-liquid vehicle systems useful in the practice of this invention include hydrocarbon polymers dissolved in aromatic and aliphatic hydrocarbon liquids; acrylic resins including the polymers or copolymers of acrylic acid, methacrylic acid, esters of these acids or acrylonitrile dissolved in aromatic hydrocarbons, chlorinated hydrocarbons, esters and ketones; halogenated polymers including the polyvinyl and polyvinylidene halides dissolved in chlorinated hydrocarbons; and nylons dissolved in phenols and lower aliphatic alcohols. Many other polymer-compatible liquid vehicle systems will be readily apparent to those skilled in the art.

Practice of this invention requires first that the polymeric material be cryogenically comminuted. By this is meant comminuting at very low temperatures, say below $-100°$ F. and preferably at about 100° F. below the embrittlement temperature of the polymeric material being comminuted. The use of liquid nitrogen, which boils at $-321°$ F., as the cryogenic refrigerant is preferred, and U.S. Pat. No. 3,771,729 describes a cryogenic comminution system for soft or resilient materials, including polyisobutylene, which has a brittlement temperature of about minus 100° F. and which gives excellent results in the present process; but other cryogenic refrigerants may be used, including for example liquefied carbon dioxide, liquefied air in some instances, liquefied halogenated hydrocarbons and liquefied noble gases including helium and argon.

After cryogenically comminuting the polymer to form smaller discrete particles, sized such that they will pass through a No. 10 U.S. standard screen, and preferably through a No. 40 U.S. standard screen, the polymer particles are introduced into and admixed with the liquid vehicle preferably while still at cryogenic, or near cryogenic, temperatures. The temperature of the liquid vehicle upon admixture with the polymer particles is not critical. It is important, however, that the liquid vehicle be at a temperature sufficiently above its pour point to withstand the cooling effect of the mixing process and remain at a temperature above the pour point. The cooling effect is insignificant when the desired concentrations of polymer particles are less than about 1%. Ambient to slightly elevated liquid vehicle temperatures are preferred.

It is preferred in the practice of this invention that the polymer particles be maintained at cold temperatures, below the embrittlement temperature of the polymer, until introduced into the liquid vehicle. Fresh polymer surfaces, particularly fresh surfaces of rubbery polymers, tend to stick together and conglomerate into clumps at temperatures above the embrittlement temperature. So long as the particles are maintained below the embrittlement temperature, and preferably below a temperature of about −100° F., they will not conglomerate on contact, and they are maintained below this temperature until introduced into the liquid vehicle which gives advantages as hereinafter described. Good results are obtained so long as cryogenic temperature is maintained until particle introduction as discrete particles into the liquid, as by free fall therein, is assured. During introduction of the particles, the liquid vehicle should be kept in motion so as to minimize particle contact before immersion in the liquid. Creation of the liquid motion should be such as to not cause unacceptable degradation of the polymer. Mechanical agitation as with a stirrer is suitable, with the agitation being mild but sufficient to prevent contact of particles while on the surface thereof. A tangential entry of the liquid causing circular flow of the hydrocarbons in the dissolution vessel can be used with good results. Motion produced by introducing a gas inert to the system, such as nitrogen, carbon dioxide, methane, natural gas or flue gas below the surface of the liquid vehicle also gives good results.

As above stated, maintaining the polymer particles at cryogenic temperature until their introduction into the liquid vehicle is preferred and gives excellent results in the rapid dissolution of the particles in the liquid, the dissolution being so rapid it is not attributable solely to increased surface area. While the reason for such rapid dissolution is not known with certainty and it is not desired to be limited by theoretical considerations, it is believed that cryogenic comminuting is a fracturing of the particles primarily along molecular boundaries so that the molecular weights of the molecules are not appreciably reduced; the resulting particles have active sites on their edges, corners and surfaces, whereby high energy surfaces are generated. Such high energy surfaces are believed to assist in the dissolution of the particles in the liquid vehicle, and maintaining cryogenic temperature is effective to preserve the high surface energy of the particles until introduction into the liquid.

The existence of high energy sites on the comminuted polymer particles has been experimentally verified by means of electron spin resonance analysis of cryogenically comminuted polymer samples. FIG. 2 depicts a typical curve obtained by such analysis. Signal intensity is plotted against magnetic field strength (or radio frequency) in the manner illustrated. In the data presented as FIG. 2, a cryogenically comminuted polyisobutylene sample was subjected to electron spin resonance analysis at a temperature of −176° C. Liquid nitrogen was used as the cryogenic refrigerant and the polymer sample was maintained at cryogenic temperatures after comminution and until the analysis was complete.

The curve obtained as shown in FIG. 2 demonstrates the presence of free radicals in the polymer particles. The most likely locus of those free radicals is the particle surfaces as this is where fracturing occurred. As the polymer particles warm, the concentration of free radicals tends to decrease and will eventually disappear probably by reaction with atmospheric oxygen, water vapor or other active compounds. In the presence of water, the effective electron charge would be greatly reduced or neutralized by reaction with a proton from water or the electron charge might be shielded by a coulomb dipole interaction.

Another effect might also contribute to the rapid dissolution of polymer particles in the liquid vehicle. Upon introducing polymer particles at cryogenic temperature into liquid vehicles at a much higher temperature, say ambient temperature, the temperature of the surfaces of the particles on contacting the liquid rapidly rises compared to the change of temperature at the particle center so that the already small particles may shatter, or fracture, forming even smaller particles or fissures throughout the particles, thus further enhancing rapid dissolution which is instantaneous for practical considerations.

The dissolution technique of this invention offers important advantages as compared to conventional practice. The rapid, almost instantaneous, dissolution or dispersion of polymers in liquids obtainable by practice of the invention provides substantial time saving in making up solutions. Polymer degradation during dissolution is greatly reduced or eliminated. In many cases, much higher concentrations of polymer in the liquid can be attained than is practical using prior art techniques.

Polymer-liquid vehicle systems prepared by the process of this invention are useful for forming films as in membrane manufacture and surface coating applications. Relatively high polymer concentrations may be used to immobilize liquids, to lower their vapor pressure and to form composites as by adding resiliency to a normally brittle matrix. Other uses include fiber formation as by spinning or extruding. Numerous other specialized uses will be apparent to those skilled in the art.

One such specialized use, which constitutes a specific embodiment of this invention, is in the use of certain long chain hydrocarbon polymers as drag-reducing additives for liquid hydrocarbons to be transported through a conduit. Appropriate hydrocarbon polymers for this application are rubbery or elastomeric in nature and have the ability, when dissolved in liquid hydrocarbons, to reduce the friction caused by flowing the hydrocarbons through a conduit. Generally such polymers cannot be effectively ground, pulverized or shredded into particles by usual means without incurring severe degradation effects on drag reducing characteristics by the lowered molecular weight resulting from aforementioned mechanical actions and without conglomeration of the particles on contacting each other. These polymers have a viscosity overage molecular weight of from about 1,000,000 to about 10,000,000. Polyisobutylene is the preferred additive of this inventive embodiment, it being remembered that, as above defined, block polymers, natural rubbers, other hydrocarbon polymers soluble in liquid hydrocarbons and which have friction-reducing properties can also be used, including for example: natural rubber; block copolymer of polystyrene-polyisoprene-polystyrene; block copolymer of polybutadiene-polyisoprene-polybutadiene; and the like, such as described in the above cited patents and which have a molecular weight of from about 500,000 to 5,000,000. This embodiment of the invention does not depend on the discovery of any new drag reducing agent. Rather, it constitutes the discovery of a new process for the introduction of certain high molecular weight hydrocarbon polymers into liquid hydrocarbons without incurring unacceptable amounts of polymer degradation. The polymers are elastic or rubbery in nature and by usual processes, i.e., processes heretofore used, require unacceptably long times for dissolution in liquid hydrocarbons. Such hydrocarbon polymers, especially in the small quantities employed for drag reduction purposes, are compatible with all uses of crude oil and fractions and products thereof so no provision need be made for their removal or the like.

By "friction-reducing" is meant the ability of a polymeric material such as polyisobutylene, when dissolved in a hydrocarbon liquid, to reduce the frictional losses experienced as the hydrocarbon liquid is transported through a conduit, thereby reducing energy requirements and pumping costs, and/or effectively increasing the capacity of the pipeline using the same pumping process. This friction-reducing effect has been described in the literature by terms such as drag reduction, pressure loss reduction, pressure reduction percentage, pressure loss, friction loss, turbulent flow friction or turbulent drag reduction, and the like. Whatever the terminology used, the practical measure of friction reducing is the ability to obtain a greater volume of fluid flow through a conduit using the same amount of energy in a set time or to flow the same amount of fluid using lesser energy in that same time period. As will be shown hereinafter, in accordance with the invention, especially good results are obtained at high flow rates of the liquid hydrocarbons, i.e., under relatively turbulent conditions of flow, although some improvement is also obtained at low flow rates.

By "hydrocarbon liquids" which are transported through conduits, as described herein, is meant hydrocarbons which are liquid under usual conditions of temperature and pressure experienced in pipelines, such as above one atmosphere pressure and from about 0° F. to 180° F. Crude petroleum and fractions thereof, including gasoline, kerosene, fuel oils, diesel oil, lubricating oils, and residual oils illustrate such hydrocarbon liquids, while additional examples include isooctane, cyclohexane, toluene, xylene, and many others.

In accordance with this embodiment, cryogenic comminuting is used to convert polyisobutylene to discrete particles of from about 0.05 to 2 mm average diameter. Cryogenic comminuting and dissolution of the polyisobutylene particles in the liquid hydrocarbon are accomplished in the manner previously described.

Hydrocarbons to be transported should contain from about 10 to 400 ppm (parts of additive per million parts of hydrocarbons by weight), and preferably when using polyisobutylene, the amount is advantageously in the range of from about 20 ppm to about 100 ppm. The amount to use in a given system will largely depend on the overall characteristics of the system, including for example the conduit length, diameter, internal finish, type of pumps, etc. and the particular additive used and the hydrocarbon or hydrocarbons to be transported, and can readily be determined. The introduction of the required amount of additive into the hydrocarbon liquid main flow can be accomplished by several convenient methods:

(a) Dissolution of the additive into a mixing tank continuously filled with a drag stream of the hydrocarbon liquid and repumped back at an appropriate flow rate into the main stream of flow.

(b) Dissolution of the additive into fixed batches of the liquid to form a high concentration therein, on the order of 5% to 10%, and then adding this concentrate in appropriate amounts into the main flow of the liquid in order to achieve the desired accelerated flow rate or decreased pressure or both. This concentrate method permits preparation and storage at one site for subsequent transportation and use at other sites.

(c) Collecting the comminuted particles into cryogenic containers having liquid nitrogen therein and maintained so that the ratio of additive particles to liquid nitrogen is between about 1:1 and 1:4. The resultant slurry of liquid nitrogen and additive particles can be maintained for an extended time period or transported in cryogenic vessels to using sites. In use, this slurry is introduced into an appropriately sized mixing tank, being continuously filled with a drag stream hydrocarbon liquid, and as in method (a), repumped back at an appropriate flow rate into the main stream of liquid hydrocarbon flow. The mixing tank should be maintained at atmosphere pressure by suitable venting to permit escape of vaporized nitrogen gas.

The hydrocarbon liquid for use in any of the above methods is advantageously the same as the liquid hydrocarbon to be transported, but other hydrocarbon liquids, for example gasoline, cyclohexane or diesel fuel, can be used as the concentrate solvent for introduction into different hydrocarbon liquids, such as crude oil.

FIG. 1 of the drawing is one simplistic illustration of a preferred embodiment of the invention. Referring to FIG. 1, a polyisobutylene slab 1 is introduced into area 2 bounded by hood 4. Such a slab may be, for example, from ¼ to ½ inch in thickness and from say one to three feet wide, with the length being such as to give convenient operation. Liquefied nitrogen, stored in tank 5, is passed via lines 6 and 8 to elongated spray header 9. Spray header 9 has discharge ports 10 spaced along its length so that liquid nitrogen is injected into space 2 adjacent to polyisobutylene slab 1. Slab 1, cryogenically cooled, is conveyed to chopper 11 where it is converted into particles 19 of an average diameter of about ¼ inch. The particles, while being kept at cryogenic temperature by liquid nitrogen injection into space 2 via lines 6 and 3, and spray header 7 having discharge ports 13, drop into space 12 enclosed by housing 14 containing screw conveyor 15. Conveyor 15 is rotated by driver means 16 so that blades 18 convey particles 19 from chopper 11 to impact mill 20. During passage through space 12, the particles are maintained at cryogenic temperature by liquid nitrogen introduced via lines 6 and 23 and through spray header 21 having discharge ports 22. Particles 19 are thus maintained at cryogenic temperature from their formation by chopper 11 to their introduction into impact mill 20. Impact mill 20 is illustrated as being a high-speed rotating hammer type enclosed by hood 17, but other impact comminution means may be used, such as ball mills or rod mills. In impact mill 20, particles 19 are comminuted to powder particles 24 having a particle diameter which will pass through a U.S. standard screen size of about No. 20. Particles 19 are maintained at cryogenic temperature during their comminution to powder particles 24, and particles 24 are also so maintained by liquid nitrogen introduced via lines 6 and 25 and spray header 26 having ports 28 after their formation until contact with liquid surface 30.

Particles 24 fall on hydrocarbon liquid surface 30, with the body of hydrocarbon liquids 31 being maintained in tank 32 equipped with stirrer 34 having driving means 35. Stirrer 34 is operated at a speed sufficient only to present a fresh surface to particles 24 to prevent conglomeration thereof on the surface. Dissolution of particles 24 in hydrocarbon 31 appears very rapid, instantaneous for practical purposes, so that the average residence time of hydrocarbons in tank 32 is not critical.

A residence time of from say 1 to 20 minutes appears adequate and from 1 to about 5 minutes is preferred. Because of this short residence time and because of the large amount of liquid hydrocarbons compared to the amount of added polyisobutylene particles, the temperature of hydrocarbons 31 is not appreciably lowered, although some lowering would not be harmful.

The main body of hydrocarbons, using crude as an example, flows through pipeline 40, being driven by pump 41, flow being in the direction shown by arrow 42. A portion of crude passing through pipeline 40 is passed via line 44 into tank 32 wherein polyisobutylene is dissolved therein. Via line 45, crude containing dissolved polyisobutylene is passed into surge tank 46 so that an adequate supply for introduction to pipeline 40 via line 48 is assured. Mild agitation means, shown as propeller 49, may be supplied to insure substantially complete dissolution of the polyisobutylene if desired.

While it is not contemplated nor necessary that the described system be gas tight, it is desirable to provide nitrogen vent 50 to conduct the gas away from the vicinity of operation. It will be understood that, wherever possible, thermal insulation such as foamed rubber, foamed polyurethane or asbestos is used to coat hoods, mechanisms and conduit exteriors, especially liquid nitrogen tank 5 and conduits such as 6, 25, 8, 3, and 23, hoods 4 and 17, housing 14 and impact mill 20. It will be further understood that the crude oil in tank 32 or surge tank 46 may be heated to assist dissolution. However, as has been found, with preferred materials, this is not necessary. In no event should the temperature be allowed to approach the decomposition temperature of the additive and, in the case of polyisbutylene, should be maintained below about 200° F. at all times. The use of ambient temperature in tanks 32 and 46 is preferred.

Appropriate controls such as valve means 60, 61, 62, 63 and 64, the use and functions of which will be apparent to those skilled in the art, are not shown; it is contemplated that computer means to maintain temperature and flow rates of polyisobutylene, nitrogen and liquid hydrocarbons will be employed.

In a preferred embodiment of the invention, chopper 11 enclosed in hood 4 is positioned directly over impact mill 20 so that particles 19, at cryogenic temperature, fall by gravity directly into the mill for comminuting into particles 24. This eliminates the need for screw conveyor 15 and related apparatus and the temperature control afforded thereby can be made up by appropriate regulation of liquid nitrogen introduction into space 2.

EXAMPLES

The following examples illustrate the process of the invention which, however, is not to be construed as limited thereby.

EXAMPLE 1

Commercially available polyisobutylene having an intrinsic viscosity (deciliters per gram) of from 5.56 to 7.23, molecular weight determined by the viscosity averaging method using the viscosity of a solution in isooctane at 2020 C. of 4,700,000 and a viscosity (poise) at 20° C. of $1.5 \times 10^{12}$, was cryogenically comminuted to particles sizes capable of passing through a No. 30 U.S. standard screen. Liquid nitrogen was used to obtain and maintain cryogenic temperature during comminution. The so-prepared particles were kept at cryogenic temperature using liquid nitrogen for a short time of less than about 30 minutes, after which the combination of liquid nitrogen and particles as a slurry were added by gravity flow to a commercially purchased diesel fuel. Conglomeration of the particles, observed to some extent on the surface of the diesel fuel, was completely prevented by mild propeller induced swirling action to present a fresh solvent surface to the falling particles. Approximately 712 pounds of the cryogenically ground polyisobutylene particles were added to 5,600 gallons of the diesel fuel to make a 1.8 percent by weight solution. A mild propeller induced swirling action was used to insure the presentation of a fresh solvent surface to the falling particles. The diesel fuel was at ambient temperature, which was about 70° F.

The concentrate of polyisobutylene in diesel fuel was used for drag reduction (friction reduction) in transporting North Slope Crude through a 14 inch outside diameter pipeline for a distance of 27,867 feet. The pipeline wall thickness was 0.250 inches. Means for pressure determination were located at the start and end of the pipeline, and a positive displacement meter was located immediately prior to the point of introduction of the polyisobutylene concentrate. A positive displacement screw pump driven by a variable speed electric motor was used for injecting the polyisobutylene concentrate into the pipeline.

Flow-pressure drop correlation for the untreated crude was first obtained by noting pressure gauge readings at various flow rates. The polyisobutylene concentrate was then injected at various concentrations and pressure readings noted for each oil flow rate. Injections of the concentrate were such as to give a polyisobutylene concentrate into the main stream of crude of approximately 10 ppm, 20 ppm, 50 ppm, and finally 75 ppm and readings were obtained for different flow rates varying in steps of 500 bbl/hr. After each change in the amount of concentrate added, the system was allowed to stabilize for each change in flow rate of the crude; this required approximately one hour after each change. From these data a pressure drop due to friction at various flow rates was obtained for untreated crude after correcting for elevation difference at pressure points for calibration and comparison to the data obtained during the injection of the polyisobutylene concentrate. Data were recorded after steady state conditions had been achieved in each instance.

Table I shows the results obtained.

TABLE I

| Run No. | Time | Flow (Bbl/hr) | Velocity$^2$ (Ft/Sec) | Conc (ppm) | P. In (psig) | P. Out (psig) | Drag Reduction (%) |
|---|---|---|---|---|---|---|---|
| 1 | 1045 | 5364 | 8.41 | 10.3 | 273.0 | 11.0 | 1.22 |
| 2 | 1055 | 5000 | 7.84 | 9.9 | 242.8 | 10.5 | 1.81 |
| 3 | 1110 | 4500 | 7.06 | 10.7 | 201.1 | 9.7 | 4.23 |
| 4 | 1120 | 4000 | 6.27 | 11.4 | 165.0 | 9.1 | 5.85 |
| 5 | 1220 | 5504 | 8.63 | 20.9 | 274.8 | 12.9 | 5.49 |
| 6 | 1230 | 4911 | 7.70 | 20.7 | 229.0 | 11.8 | 5.66 |
| 7 | 1240 | 3978 | 6.24 | 20.9 | 169.0 | 10.5 | 3.29 |
| 8 | 1250 | 4444 | 6.97 | 20.4 | 193.2 | 11.3 | 7.26 |
| 9 | 1355 | 5714 | 8.96 | 50.0 | 254.4 | 14.6 | 19.18 |
| 10 | 1405 | 5240 | 8.22 | 47.1 | 229.0 | 13.9 | 16.40 |
| 11 | 1415 | 4718 | 7.40 | 46.9 | 196.8 | 13.3 | 15.48 |
| 12 | 1425 | 4150 | 6.51 | 45.7 | 166.4 | 12.6 | 12.89 |
| 13 | 1435 | 3610 | 5.66 | 45.8 | 136.8 | 11.9 | 11.84 |
| 14 | 1540 | 5487 | 8.60 | 78.5 | 228.0 | 16.0 | 23.89 |
| 15 | 1555 | 5070 | 7.95 | 77.2 | 201.1 | 15.3 | 24.29 |
| 16 | 1605 | 4639 | 7.27 | 76.7 | 186.0 | 14.3 | 18.95 |
| 17 | 1615 | 4211 | 6.60 | 76.2 | 160.0 | 14.5 | 19.97 |

TABLE I-continued

| Run No. | Time | Flow (Bbl/hr) | Velocity[2] (Ft/Sec) | Conc (ppm) | P. In (psig) | P. Out (psig) | Drag Reduction (%) |
|---|---|---|---|---|---|---|---|
| 18 | 1630 | 3515 | 5.51 | 74.8 | 128.8 | 13.7 | 15.67 |

[1]Clock reading of time of day.
[2]Linear velocity of hydrocarbons through the pipeline.

Runs 1 through 4 were obtained using a polyisobutylene concentrate solution of about 10 ppm; flow rates were progressively reduced in steps of about 500 bbl/hr., as shown. It will be noted that the polyisobutylene was effective in reducing drag and the effect thereon increased with decreasing flow rate; i.e., with decreasing turbulence.

Runs 5 through 8 were performed using a concentrate of polyisobutylene of about 20 ppm, followed with the same procedure as for Runs 1 through 4. It will be noted that again the polyisobutylene is effective and effectiveness increased with decreasing flow rate.

In runs 9 through 13, the polyisobutylene concentrate was increased to about 50 ppm and the procedure of Runs 1 through 4 repeated; again the flow rate was decreased by steps of 500 bbl/hr to observe the effect on drag reduction. The effectiveness of this concentrate is significantly above that obtained at 10 ppm and 20 ppm, and the effectiveness decreased with decreasing flow rate; i.e., increased with increasing turbulence.

Runs 14 through 18 use a concentration of about 75 ppm of polyisobutylene and again, following the same procedure, an effectiveness of well over 20% was obtained at the higher flow rates with the effectiveness decreasing somewhat with decreasing flow rate.

The highest effectiveness was obtained by using a concentration of polyisobutylene above 20 ppm, and especially good results were obtained at relatively high flow rates of the main body of hydrocarbons.

EXAMPLE 2

The same polyisobutylene of Example 1 was cryogenically ground as therein described, and the particles were maintained at cryogenic temperature until contacting with kerosene, i.e., with the hydrocarbons contained in the kerosene fraction of petroleum. These hydrocarbons boil in the range of from about 310° F. Mild stirring was used during contacting of the particles with kerosene, and dissolution appeared to be instantaneous.

Sufficient concentrate was added to Sadlerochit (North Slope) Crude Oil to give the indicated concentrations of polyisobutylene therein.

TABLE II

| Concentration of Polyisobutylene (ppm) | Pipe Inside Diameter (in.) | Velocity (ft/sec) | Drag Reduction (%) |
|---|---|---|---|
| 20 | 1.049 | 4.46 | 21.6 |
|  |  | 5.10 | 22.2 |
|  |  | 5.66 | 29.3 |
|  |  | 6.61 | 31.4 |
|  |  | 8.20 | 37.0 |
| 50 | 1.049 | 4.59 | 32.9 |
|  |  | 5.54 | 38.4 |
|  |  | 6.55 | 41.8 |
|  |  | 8.15 | 46.5 |
| 50 | 2.067 | 2.59 | 5.3 |
|  |  | 3.39 | 23.2 |
|  |  | 6.26 | 39.6 |

Drag reduction was very significant and greater improvement was obtained at relatively high velocities.

EXAMPLE 3

The concentrate of polyisobutylene in diesel fuel prepared in Example 1 was used to show drag reduction in the pipeline transportation of diesel fuel. The procedure of Example 2 was followed and the following results obtained:

TABLE III

| Concentration of Polyisobutylene (ppm) | Pipe Inside Diameter (in.) | Velocity (ft/sec) | Drag Reduction (%) |
|---|---|---|---|
| 20 | 1.049 | 3.0 | 24.0 |
|  |  | 2.3 | 14.8 |
|  |  | 1.9 | 9.6 |
|  |  | 2.1 | 13.9 |
|  |  | 1.5 | 0.8 |
|  |  | 1.3 | 0.0 |
|  |  | 1.6 | 6.4 |
|  |  | 2.1 | 14.6 |
|  |  | 2.5 | 18.5 |
|  |  | 2.7 | 19.6 |
|  |  | 3.2 | 24.5 |
|  |  | 1.6 | 2.1 |
|  |  | 1.8 | 7.4 |
| 50 | 2.067 | 3.0 | 28.2 |
|  |  | 2.3 | 20.2 |
|  |  | 1.9 | 15.1 |
|  |  | 1.7 | 14.6 |
|  |  | 2.1 | 21.7 |
|  |  | 2.5 | 22.7 |
|  |  | 2.7 | 29.5 |
|  |  | 3.2 | 32.9 |
|  |  | 1.3 | 8.8 |
|  |  | 1.6 | 9.4 |
|  |  | 1.8 | 15.1 |
|  |  | 2.0 | 18.9 |

EXAMPLE 4

A concentrate of polyisobutylene in kerosene having from 1% to 2% by weight of the polymer was prepared for subsequent introduction in hydrocarbons to be transported through a conduit. Cubes of polyisobutylene measuring between about $\frac{3}{8}$ inch and $\frac{1}{2}$ inch, were added, while largely conglomerated, to kerosene in a container with provision made for gentle rotating motion. The polyisobutylene had a molecular weight of about 4,700,000 $\overline{M}_\nu$, and an amount sufficient to give the desired concentration when completely dissolved was added. Several batches were prepared. A mixing time of from 10 to 14 days were required before complete dissolution was obtained. The resulting concentrations were tested by injection into a flowing stream of additional kerosene to form a final polyisobutylene concentration of 44 ppm, and flowing through a copper pipe $\frac{1}{2}$ inch internal diameter and about 150 feet in length. A reduction in friction, as determined by the pressure drop in the pipe, was about 40%.

When this Example is repeated in accordance with the present invention, the cryogenically ground polyisobutylene particles are contacted with mildly stirred kerosene and substantially immediately dissolved. When tested in additional kerosene in the same manner as above, substantially the same friction reduction, about 40% is obtained.

EXAMPLE 5

When Example 4 is repeated except that vigorous mechanical agitation is provided to dissolve the polyisobutylene, the effectiveness of the resulting concentrate is decreased to about 28% reduction in friction, believed due to a decrease in the molecular weight of the polymer caused by the vigorous mechanical stirring.

The foregoing examples illustrate specific embodiments of the invention. It may be noted that inconsistencies may appear, as in Example 1 at low polyisobutylene concentration, below about 20 ppm, when using conduits of widely different diameters. In the preferred concentration range of above 20 ppm of polyisobutylene in the liquid hydrocarbons transported, any such inconsistencies may be expected to disappear. Repeating the examples according to the prior art by chopping, grinding or shredding polyisobutylene and dissolving the so produced particles in hydrocarbons requires hours and usually many hours of stirring so that the shearing action degrades the additive, and/or the application of heat to assist the dissolution which also tends to degrade the polymer. The time required and the degrading of the polyisobutylene make these and comparable processes uneconomical.

When subjected to shearing conditions, polyisobutylene will be degraded, i.e., there is a lowering of the molecular weight, the amount being dependent upon the severity of the conditions, as discussed in Example 5. As observed in Example 1, when used in large size conduits, degradation due to flow is minimal. However, where pumping or other means are employed which impart a high shearing action to polyisobutylene, it may be advantageous to inject the additive into the hydrocarbons being transported at points immediately following such shearing means to insure excellent operation.

In accordance with the present invention, practically instantaneous dissolution of polyisobutylene is essential so that immediate introduction into hydrocarbons being transported can be achieved. It is also possible to include larger particles which do not so immediately dissolve, but which slowly dissolve as they travel with the hydrocarbons through the conduit so that additional protection against drag increase at locations remote from the additive introduction is obtained.

EXAMPLE 6

Commercially available polyethylene was cryogenically comminuted to particles of a size capable of passing through a No. 30 U.S. standard screen. Liquid nitrogen was used to obtain and maintain cryogenic temperature during comminution. The so-prepared particles were maintained at cryogenic temperature using liquid nitrogen until they were added by gravity flow to mildly agitated toluene. A dilute solution of polyethylene in toluene was obtained. The solution would readily form thin, coherent and transparent films upon evaporation of the toluene when spread on a solid surface.

EXAMPLE 7

A sample of commercially available polystyrene was cryogenically comminuted in the manner described in Example 6. One portion of the so-prepared particles was maintained at cryogenic temperature using liquid nitrogen until it was added by gravity flow to mildly agitated toluene. Dissolution of the polystyrene in the toluene was essentially instantaneous. A second portion of the cryogenically ground polystyrene was allowed to warm to room temperature and was thereafter added to toluene. Dissolution of the warmed polystyrene in toluene was observed to be much slower than was the dissolution of polystyrene maintained at cryogenic temperature.

EXAMPLE 8

Cryogenically comminuted polyisobutylene was added as a slurry in liquid nitrogen to Sadlerochit (Alaskan North Slope) crude oil by the method described in Example 1 to obtain concentrations of polyisobutylene in the crude oil as high as 30 weight percent as determined by extraction analysis. The samples containing relatively high polyisobutylene concentrations, above about 10% to 15%, were rubbery, tacky solids at room temperature.

The viscosity of several intermediate concentration samples were determined by the cone and plate method using a Weissenberg rheogoniometer at a temperature 24° C. The viscosity, $\eta$, was calculated from the equaltion:

$$\eta = \Sigma/\gamma$$

where
$\Sigma$ is the shear stress, and
$\gamma$ is the rate of shear.
The following data were obtained:

TABLE IV

| Rate of Shear ($\sec^{-1}$) | Viscosity $\times 10^{-3}$ (poise) | | |
|---|---|---|---|
| | 4.0 Wt. %* | 7.7 Wt. %* | 9.4 Wt. %* |
| 0.00886 | 9.15 | | 77.4 |
| 0.0177 | 8.12 | 50.3 | 60.0 |
| 0.0352 | 5.80 | 35.9 | 50.5 |
| 0.0702 | 4.00 | 23.1 | 33.9 |
| 0.139 | 2.63 | 14.3 | 24.0 |
| 0.280 | 1.67 | 8.47 | 16.5 |
| 0.556 | 1.06 | 5.00 | 10.5 |
| 1.11 | 0.694 | 3.04 | 6.44 |
| 2.22 | 0.443 | 1.80 | 3.80 |
| 4.43 | 0.268 | 1.05 | 2.25 |
| 8.86 | | | 1.41 |
| 17.7 | | | 0.883 |
| 35.2 | | | 0.531 |

*Polyisobutylene in crude oil.

The viscosities listed are equilibrium values. At intermediate shear rates a maximum appears in the stress vs. time curves. At the higher shear rates a minimum appears in the stress vs. time curves.

The foregoing description and Examples of the invention are intended to be explanatory thereof, and various changes may be made, within the scope of the following claims, without departing from the spirit of the invention.

The invention claimed is:

1. Process for dissolving a high molecular weight hydrocarbon polymer in liquid hydrocarbons which comprises chilling to cryogenic temperature said polymer, comminuting the chilled polymer at cryogenic temperature to form discrete particles displaying a high surface energy state and contacting the so-formed particles at or near cryogenic temperature and while in said high surface energy state with liquid hydrocarbons whereby the polymer particles are dissolved therein.

2. Process according to claim 1 wherein the particles contacted with liquid hydrocarbon are so contacted as discrete particles.

3. Process according to claim 1 wherein the high molecular weight hydrocarbon polymer is polyisobutylene.

4. Process according to claim 1 wherein liquid nitrogen is used as a cryogenic refrigerant to chill said polymer.

5. Process of reducing friction caused by flowing hydrocarbons through a conduit which comprises cryogenically comminuting a long chain rubbery hydrocarbon polymer to form particles thereof, said particles having high surface energy, dissolving the so-formed particles while at or near cryogenic temperature and in said high surface energy state in liquid hydrocarbon and flowing the resulting solution through a conduit.

6. The process of claim 5 wherein said particles are maintained below the polymer embrittlement temperature until introduced into said liquid hydrocarbon.

7. Process according to claim 6 wherein said long chain rubbery hydrocarbon polymer is polyisobutylene.

8. Process according to claim 6 wherein said long chain rubbery hydrocarbon polymer is a block copolymer.

9. Process according to claim 8 wherein said long chain rubbery hydrocarbon polymer is polystyrene-polyisoprene-polystyrene.

10. Process according to claim 8 wherein said long chain rubbery hydrocarbon polymer is polybutadiene-polyisoprene-polybutadiene.

11. Process according to claim 6 wherein said long chain rubbery hydrocarbon polymer is natural rubber.

12. The process of claim 6 wherein said hydrocarbon polymer is dissolved in a mixing tank continuously filled with a drag stream from a main hydrocarbon stream and wherein said drag stream, now containing polymer, is merged with said main stream.

13. The process of claim 6 wherein said hydrocarbon polymer is dissolved in fixed batches of said liquid hydrocarbon at a concentration up to about 10% and wherein said batches are metered into a main hydrocarbon stream flowing through a conduit to thereby reduce pressure drop in or increase flow through said conduit.

14. The process of claim 5 wherein liquid nitrogen is used as a cryogenic refrigerant for the comminution step.

15. Process of reducing friction caused by flowing hydrocarbons through a conduit which comprises cryogenically comminuting polyisobutylene having a molecular weight of from about 1,000,000 to about 10,000,000 to form discrete particles of enhanced surface energy and of a size to pass through a No. 10 U.S. Standard screen scale, contacting the so-formed particles of polyisobutylene at or near cryogenic temperature and while in said enhanced surface energy state as discrete particles with liquid hydrocarbon whereby said particles are rapidly dissolved in the liquid hydrocarbons, and flowing the liquid hydrocarbons containing dissolved polyisobutylene through a conduit.

16. A process for dissolving a thermoplastic polymer in a compatible liquid vehicle which comprises cryogenically comminuting said polymer to form discrete particles of enhanced surface energy and admixing said particles with the liquid vehicle while while maintaining said particles in a high surface energy state and at or near cryogenic temperature until introduced into said liquid.

17. The process of claim 16 wherein liquid nitrogen is used as the cryogenic refrigerant.

18. The process of claim 16 wherein said thermoplastic polymer is linear and is essentially non-crosslinked.

19. The process of claim 16 wherein said liquid vehicle is at ambient to slightly elevated temperature upon admixing with said particles.

20. The process of claim 16 wherein said particles are sized such that they will pass through a 10 U.S. standard screen.

21. A process for dissolving a thermoplastic polymer in a compatible liquid vehicle which comprises chilling to cryogenic temperature said polymer, comminuting the chilled polymer at cryogenic temperature to form discrete particles having free radicals thereon and contacting the so-formed, free radical-containing particles while at or near cryogenic temperature with the liquid vehicle whereby the particles are dissolved therein.

* * * * *